(12) United States Patent
Auer et al.

(10) Patent No.: US 9,992,788 B2
(45) Date of Patent: Jun. 5, 2018

(54) REDUCING INTERFERENCE BETWEEN NETWORK NODES

(71) Applicant: TELEFONAKTIEBOLAGET L M ERICSSON (PUBL), Stockholm (SE)

(72) Inventors: Gunther Auer, Stockholm (SE); Smruti Panigrahi, Uppsala (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 36 days.

(21) Appl. No.: 15/031,395

(22) PCT Filed: Feb. 13, 2014

(86) PCT No.: PCT/SE2014/050174
§ 371 (c)(1),
(2) Date: Apr. 22, 2016

(87) PCT Pub. No.: WO2015/072902
PCT Pub. Date: May 21, 2015

(65) Prior Publication Data
US 2016/0249375 A1    Aug. 25, 2016

Related U.S. Application Data

(60) Provisional application No. 61/902,930, filed on Nov. 12, 2013.

(51) Int. Cl.
*H04W 72/12* (2009.01)
*H04W 72/08* (2009.01)
*H04W 92/20* (2009.01)

(52) U.S. Cl.
CPC ..... *H04W 72/1226* (2013.01); *H04W 72/085* (2013.01); *H04W 92/20* (2013.01)

(58) Field of Classification Search
None
See application file for complete search history.

(56) References Cited

U.S. PATENT DOCUMENTS

| 8,543,123 B2 | 9/2013 | Moon et al. |
| 2005/0282550 A1* | 12/2005 | Cho ..................... H04W 72/10 455/447 |

(Continued)

FOREIGN PATENT DOCUMENTS

| WO | 2011119750 A1 | 9/2011 |
| WO | 2013137795 A1 | 9/2013 |

OTHER PUBLICATIONS

Lindbom, et al., Enhanced Inter-cell Interference Coordination for Heterogeneous Networks in LTE-Advanced: A Survey, arXiv preprint arXiv:1112.1344, Dec. 7, 2011.

(Continued)

*Primary Examiner* — Candal Elpenord (57) ABSTRACT

It is presented a method for reducing interference between network nodes of a cellular network, the method being performed in an aggressor network node, being a network node risking to interfere with transmissions to a first wireless device by a victim network node. The method comprises the steps of: receiving a transmission avoidance request from the victim network node, the transmission avoidance request comprising a reference to at least one risk resource unit intended to be used for transmissions by the victim network node to the first wireless device; determining whether to avoid user data transmissions to a second wireless device using the at least one risk resource unit; and when it is determined to avoid user data transmissions using the at least one risk resource unit, avoiding user data transmission using the at least one risk resource unit.

20 Claims, 6 Drawing Sheets

(56) References Cited

U.S. PATENT DOCUMENTS

| | | | |
|---|---|---|---|
| 2011/0081865 A1* | 4/2011 | Xiao | H04W 52/243 |
| | | | 455/63.1 |
| 2011/0310802 A1 | 12/2011 | Song et al. | |
| 2012/0231742 A1 | 9/2012 | Barberis et al. | |
| 2013/0267230 A1* | 10/2013 | Lin | H04W 24/10 |
| | | | 455/436 |
| 2013/0286883 A1* | 10/2013 | Kim | H04W 24/10 |
| | | | 370/252 |
| 2014/0036805 A1* | 2/2014 | Sadek | H04W 52/367 |
| | | | 370/329 |
| 2014/0243041 A1* | 8/2014 | Zhao | H04W 88/06 |
| | | | 455/552.1 |
| 2015/0080008 A1* | 3/2015 | Ngai | H04W 52/243 |
| | | | 455/452.2 |
| 2016/0021621 A1* | 1/2016 | Wu | H04W 52/244 |
| | | | 370/311 |

OTHER PUBLICATIONS

3GPP TSG-RAN WG1 #74, Discussion on backhaul link signalling for downlink CoMP, R1-134144, Intel Corporation, Guangzhou, China, Oct. 7-11, 2013.

* cited by examiner

REDUCING INTERFERENCE BETWEEN NETWORK NODES

This application is a 371 of International Application No. PCT/SE2014/050174, filed Feb. 13, 2014, which claims the benefit of U.S. Application No. 61/902,930, filed Nov. 12, 2013, the disclosures of which are fully incorporated herein by reference.

TECHNICAL FIELD

The invention relates to reducing interference between network nodes.

BACKGROUND

LTE (Long Term Evolution) is designed for a frequency reuse of one, meaning that every base station uses the whole system bandwidth for transmission and there is no frequency planning among cells to cope with interference from neighbouring cells. A consequence of this is that LTE macro-cell deployments experience heavy interference at the cell boundaries. One means to mitigate the effects of interference is inter-cell interference coordination (ICIC), where physical resource blocks (PRBs) in one cell or sector are muted in a coordinated manner, so that the SINR (Signal to Interference and Noise Ratio) of cell-edge users scheduled in these PRBs in adjacent cells is boosted.

US 2012/0231742 presents an interference coordination method for a radio communication system including a plurality of user equipment configured to communicate on radio resources with transceiver stations. The transceiver stations exchange between transceiver stations one or more coordination messages concerning interference on an interfered radio resource, and determine a score of a potential allocation of the interfered radio resource to potentially-interfered user equipment based on said coordination message or messages. In order to calculate the score, interfering transceivers send "push" messages, while interfered transceivers send out "pull" messages. However, this bi-directional message exchange for interference coordination increases the load on the X2 interface and may aggravate the already present issues with latency.

SUMMARY

It is an object to facilitate ICIC without resorting to a bi-directional message exchange.

According to a first aspect, it is presented a method for reducing interference between network nodes of a cellular network, the method being performed in an aggressor network node, being a network node risking to interfere transmissions to a first wireless device by a victim network node. The method comprises the steps of: receiving a transmission avoidance request from the victim network node, the transmission avoidance request comprising a reference to at least one risk resource unit intended to be used for transmissions by the victim network node to the first wireless device; determining whether to avoid user data transmissions to a second wireless device using the at least one risk resource unit; and when it is determined to avoid user data transmissions using the at least one risk resource unit, avoiding user data transmission using the at least one risk resource unit.

Using this method, the aggressor node is made aware of the at least one risk resource unit of the victim network node, and can thereby avoid transmissions interfering with the at least one risk resource unit.

The method may further comprise the step of: when it is determined not to avoid user data transmissions using the at least one risk resource unit, scheduling data transmission to the second wireless device using at least part of the at least one risk resource unit. In other words, the aggressor network node may determine that its own transmissions take precedence.

The step of determining may comprise determining to avoid user data transmissions to the second wireless device using the at least one risk resource unit when such avoiding is not expected to significantly degrade a user experience of the second wireless device. This provides better performance for the victim network node while not significantly affecting the aggressor network node, leading to a higher total network performance.

The step of determining may comprise determining to always avoid user data transmissions to the second wireless device using the at least one risk resource unit when a user priority for transmission by the victim network node to the first wireless device is higher than a user priority for transmission by the aggressor network node of user data transmissions to the second wireless device. In other words, the higher priority of the transmissions by the victim network node overrides the aggressor node transmissions.

Each one of the at least one risk resource units may be defined using physical resource blocks, PRBs, each PRB being restricted to a time slot within a sub-frame and a frequency band.

Each one of the at least one risk resource units is defined as a sub-frame.

In the receiving step, the transmission avoidance request may comprise references to resource units intended to be used for transmissions by the victim network node to a plurality of wireless devices.

According to a second aspect, it is presented a network node for reducing interference between network nodes of a cellular network, the network node running a risk of being an aggressor network node, being a network node risking to interfere transmissions to a first wireless device by a victim network node. The network node comprises: a processor; and a memory storing instructions that, when executed by the processor, causes the network node to: receive a transmission avoidance request from the victim network node, the transmission avoidance request comprising a reference to at least one risk resource unit intended to be used for transmissions by the victim network node to the first wireless device; determine whether to avoid user data transmissions to a second wireless device using the at least one risk resource unit; and when it is determined to avoid user data transmissions using the at least one risk resource unit, avoiding user data transmission using the at least one risk resource unit.

The network node may further comprise instructions that, when executed by the processor, causes the network node to schedule data transmission to the second wireless device using at least part of the at least one risk resource unit when it is determined not to avoid user data transmissions using the at least one risk resource unit.

The instructions to determine may comprise instructions that, when executed by the processor, causes the network node to determine to avoid user data transmissions to the second wireless device using the at least one risk resource unit when such avoiding is not expected to significantly degrade a user experience of the second wireless device.

The instructions to determine comprise instructions that, when executed by the processor, causes the network node to determining to always avoid user data transmissions to the second wireless device using the at least one risk resource unit when a user priority for transmission by the victim network node to the first wireless device is higher than a user priority for transmission by the aggressor network node of user data transmissions to the second wireless device.

Each one of the at least one risk resource units may be defined using physical resource blocks, PRBs, each PRB being restricted to a time slot within a sub-frame and a frequency band.

Each one of the at least one risk resource units may be defined as a sub-frame.

The transmission avoidance request may comprise references to resource units intended to be used for transmissions by the victim network node to a plurality of wireless devices.

According to a third aspect, it is presented a network node comprising means for receiving, in an aggressor network node, being a network node risking to interfere transmissions to a first wireless device by a victim network node, a transmission avoidance request from the victim network node, the transmission avoidance request comprising a reference to at least one risk resource unit intended to be used for transmissions by the victim network node to the first wireless device; means for determining whether to avoid user data transmissions to a second wireless device using the at least one risk resource unit; and means for when it is determined to avoid user data transmissions using the at least one risk resource unit, avoiding user data transmission using the at least one risk resource unit.

The network node may further comprise means for, when it is determined not to avoid user data transmissions using the at least one risk resource unit, scheduling data transmission to the second wireless device using at least part of the at least one risk resource unit.

The means for determining may comprise means for determining to avoid user data transmissions to the second wireless device using the at least one risk resource unit when such avoiding is not expected to significantly degrade a user experience of the second wireless device.

The means for determining may comprise means for determining to always avoid user data transmissions to the second wireless device using the at least one risk resource unit when a user priority for transmission by the victim network node to the first wireless device is higher than a user priority for transmission by the aggressor network node of user data transmissions to the second wireless device.

Each one of the at least one risk resource units may be defined using physical resource blocks, PRBs, each PRB being restricted to a time slot within a sub-frame and a frequency band.

Each one of the at least one risk resource units is defined as a sub-frame.

The transmission avoidance request may comprise references to resource units intended to be used for transmissions by the victim network node to a plurality of wireless devices.

According to a fourth aspect, it is presented a computer program for reducing interference between network nodes of a cellular network, the computer program being configured to be performed in an aggressor network node, being a network node risking to interfere transmissions to a first wireless device by a victim network node, the computer program comprising computer program code which, when run on a network node, causes the network node to: receive a transmission avoidance request from the victim network node, the transmission avoidance request comprising a reference to at least one risk resource unit intended to be used for transmissions by the victim network node to the first wireless device; determine whether to avoid user data transmissions to a second wireless device using the at least one risk resource unit; and when it is determined to avoid user data transmissions using the at least one risk resource unit, avoiding user data transmission using the at least one risk resource unit.

According to a fifth aspect, it is presented a computer program product comprising a computer program according to the fourth aspect and a computer readable means on which the computer program is stored.

According to a sixth aspect, it is presented a method for reducing interference between network nodes of a cellular network, the method being performed in a victim network node, being at risk of having its transmissions of first user data to a first wireless device being interfered by transmissions of second user data to a second wireless device by an aggressor network node. The method comprises the steps of: determining a time requirement of the first user data to be transmitted to the first wireless device by the victim network node; estimating a number of risk resource units which need to be protected from interference to be able to transmit the user data to the first wireless device; and transmitting a transmission avoidance request to the aggressor network node, the transmission avoidance request comprising a reference to at least one risk resource unit intended to be used for transmissions by the victim network node to the first wireless device.

In the step of transmitting, the transmission avoidance request may comprise a user priority for transmission of the first user data by the victim network node to the first wireless device.

Each one of the at least one risk resource units may be defined using physical resource blocks, PRBs, each PRB being restricted to a time slot within a sub-frame and a frequency band.

Each one of the at least one risk resource units may be defined as a sub-frame.

According to a seventh aspect, it is presented a network node running a risk of being a victim node, with regard to interference between network nodes of a cellular network, being at risk of having its transmissions of first user data to a first wireless device being interfered by transmissions of second user data to a second wireless device by an aggressor network node. The network node comprises: a processor; and a memory storing instructions that, when executed by the processor, causes the network node to: determine a time requirement of the first user data to be transmitted to the first wireless device by the victim network node; estimate a number of risk resource units which need to be protected from interference to be able to transmit the user data to the first wireless device; and transmit a transmission avoidance request to the aggressor network node, the transmission avoidance request comprising a reference to at least one risk resource unit intended to be used for transmissions by the victim network node to the first wireless device.

The transmission avoidance request may comprise a user priority for transmission of the first user data by the victim network node to the first wireless device.

Each one of the at least one risk resource units may be defined using physical resource blocks, PRBs, each PRB being restricted to a time slot within a sub-frame and a frequency band.

Each one of the at least one risk resource units may be defined as a sub-frame.

According to an eighth aspect, it is presented a network node comprising means for, in a victim network node, being at risk of having its transmissions of first user data to a first wireless device being interfered by transmissions of second user data to a second wireless device by an aggressor network node, determining a time requirement of the first user data to be transmitted to the first wireless device by the victim network node; means for estimating a number of risk resource units which need to be protected from interference to be able to transmit the user data to the first wireless device; and means for transmitting a transmission avoidance request to the aggressor network node, the transmission avoidance request comprising a reference to at least one risk resource unit intended to be used for transmissions by the victim network node to the first wireless device.

The transmission avoidance request may comprise a user priority for transmission of the first user data by the victim network node to the first wireless device.

Each one of the at least one risk resource units may be defined using physical resource blocks, PRBs, each PRB being restricted to a time slot within a sub-frame and a frequency band.

Each one of the at least one risk resource units may be defined as a sub-frame.

According to a ninth aspect, it is presented a computer program for reducing interference between network nodes of a cellular network, the computer program being configured to be performed in a victim node, with regard to interference between network nodes of a cellular network, being at risk of having its transmissions of first user data to a first wireless device being interfered by transmissions of second user data to a second wireless device by an aggressor network node. The computer program comprises computer program code which, when run on a network node, causes the network node to: determine a time requirement of the first user data to be transmitted to the first wireless device by the victim network node; estimate a number of risk resource units which need to be protected from interference to be able to transmit the user data to the first wireless device; and transmit a transmission avoidance request to the aggressor network node, the transmission avoidance request comprising a reference to at least one risk resource unit intended to be used for transmissions by the victim network node to the first wireless device.

According to a tenth aspect, it is presented a computer program product comprising a computer program according to the ninth aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
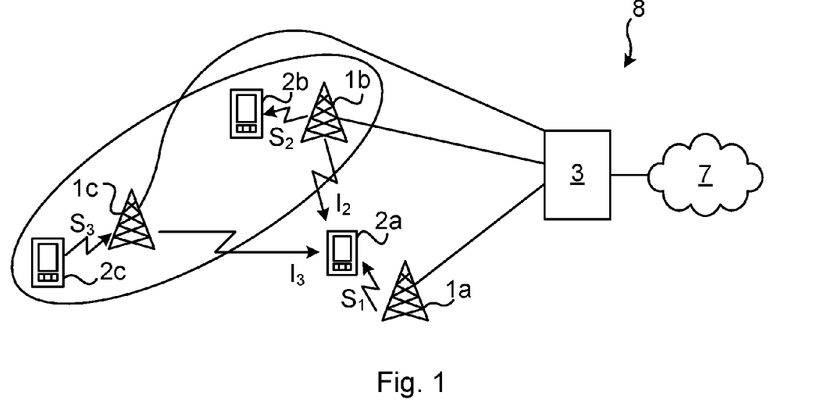
FIG. 1 is a schematic drawing illustrating an environment in which embodiments presented herein can be applied.

FIG. 1 is a schematic diagram illustrating an environment where embodiments presented herein can be applied. A cellular network 8 comprises a core network 3 and a radio access network comprising a first network node 1a, a second network node 1b and a third network node 1c. The network nodes 1a-c, are here in the form of evolved Node Bs also known as eNBs but could also be in the form of Node Bs (NodeBs/NBs) and/or BTSs (Base Transceiver Stations) and/or BSSs (Base Station Subsystems), etc. The network nodes 1a-c provide radio connectivity to a plurality of wireless devices 2a-c. The term wireless device is also known as user equipment (UE), mobile terminal, user terminal, user agent, etc.

Each one of the network nodes 1a-c provides radio coverage in one or more respective radio cells. Uplink (UL) communication, from the wireless devices 2a-c to the network nodes 1a-c, and downlink (DL) communication, from the network nodes 1a-c to the wireless devices 2a-c occur over a wireless radio interface. The radio conditions of the wireless radio interface vary over time and also depend on the position of the respective wireless devices 2a-c, due to effects such as interference, fading, multipath propagation, etc.

The core network 3 provides access to central functions in the mobile communication network and connectivity to other communication networks 7, such as the Internet.

The cellular network 8 may e.g. comply with any one or a combination of LTE (Long Term Evolution), UMTS (Universal Mobile Telecommunications System) utilising W-CDMA (Wideband Code Division Multiplex), CDMA2000 (Code Division Multiple Access 2000), or any other current or future wireless network, as long as the principles described hereinafter are applicable. Nevertheless, LTE will be used below to fully illustrate a context in which embodiments presented herein can be applied.

Looking now at the radio access network in the illustrated example, the first network node 1a provides coverage to a first wireless device 2a, the second network node 1b provides coverage to a second wireless device 2b and the third network node 1c provides coverage to a third wireless device 2c.

The first wireless device 2a receives a first downlink signal S1 from the first network node 1a. The second wireless device 2b receives a second downlink signal $S_2$ from the second network node 1b. The third wireless device 2c receives a third downlink signal $S_3$ from the third network node 1c. However, looking from the perspective of the first wireless device 2a, the second downlink signal $S_2$ also results in a first interfering downlink signal $I_2$ and the third downlink signal $S_3$ also results in a second interfering downlink signal $I_3$.

Downlink interfering signals also exist for the second wireless device 2b and the third wireless device 2c, but these interfering signals are omitted in FIG. 1 for reasons of clarity.

Looking now to FIGS. 2-4, some aspects of channel structure for LTE will be explained.

Figure 2:
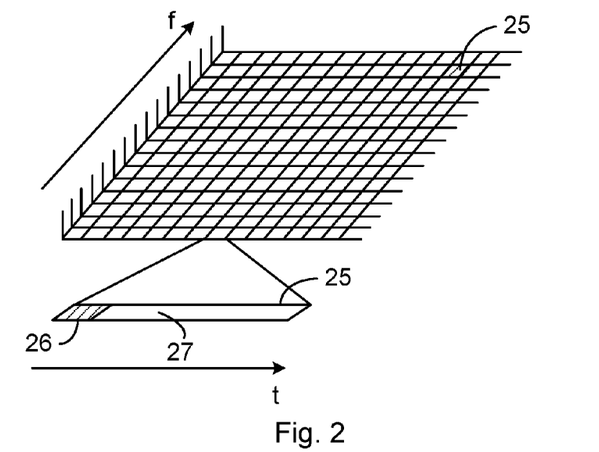
FIG. 2 is a schematic diagram illustrating the physical resources for LTE downlink.

FIG. 2 is a schematic diagram illustrating the physical resources for downlink communication in LTE (Long Term Evolution). Downlink communication is communication from a network node to a wireless device. LTE uses OFDM (Orthogonal Frequency Division Multiplexing) in the downlink and DFT (Discrete Fourier Transform)-spread OFDM in the uplink. The basic LTE downlink physical resource can thus be seen as a time-frequency grid as illustrated in FIG. 2, where each resource element 25 corresponds to one OFDM subcarrier during one OFDM symbol interval. Each resource element 25 comprises cyclic prefix section 26 and a main section 27.

Figure 3:
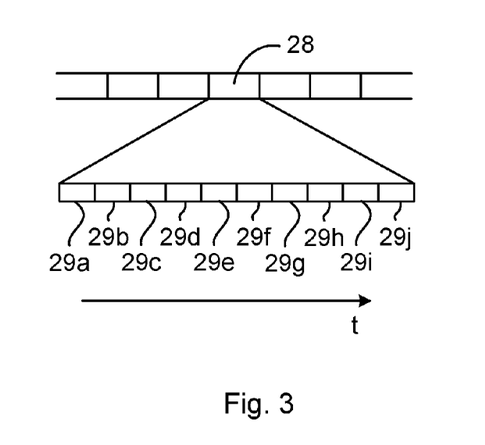
FIG. 3 is a schematic diagram illustrating LTE time-domain structure.

FIG. 3 is a schematic diagram illustrating LTE time-domain structure. In the time domain, LTE downlink transmissions are organised into radio frames 28 of 10 ms, each radio frame consisting of ten equally-sized subframes 29a-j of length $T_{subframe}$=1 ms, as can be seen in FIG. 3.

Figure 4:
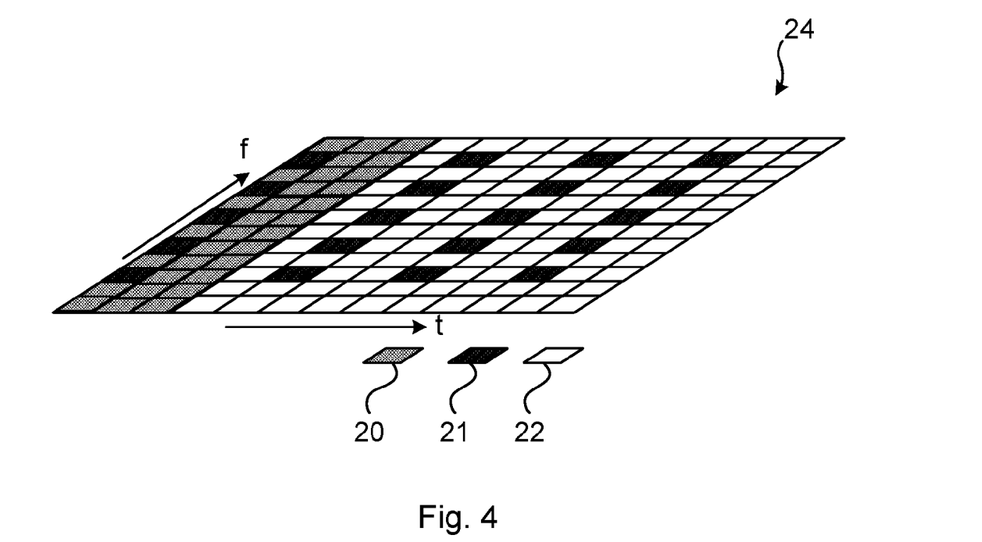
FIG. 4 is a schematic diagram illustrating a downlink resource block.

FIG. 4 is a schematic diagram illustrating a downlink resource block 24. The resource allocation in LTE is typically described in terms of resource blocks (RB), also known as physical resource blocks (PRBs), where a resource block corresponds to one or more slots (each 0.5 ms) in the time domain and twelve contiguous subcarriers in the frequency domain. A pair of two adjacent resource blocks in the time direction (1.0 ms) is known as a resource block pair. Each resource block comprises a number of resource elements, where each resource element occupies one subcarrier in the frequency domain and one OFDM symbol in the time domain. The number of OFDM symbols in a resource block can vary and can e.g. be six or seven OFDM symbols.

Downlink transmissions are dynamically scheduled, i.e. in each subframe the network node transmits control information about to which wireless devices data is transmitted and upon which resource blocks the data is transmitted, in the current downlink subframe. This control signaling is typically transmitted in a control region 20 in the first one, two or three OFDM symbols in each subframe and the number n=1, 2 or 3 is known as the Control Format Indicator (CFI), thus indicating the number of OFDM symbols being part of the control region 20. The control region also contains physical downlink control channels (PDCCH) and possibly also physical HARQ (Hybrid ARQ) indication channels (PHICH) carrying ACK/NACK for the uplink transmission. The region of the remaining 14-n OFDM symbols in the subframe is denoted the shared data channel region and it contains the shared data channel (PDSCH).

The downlink subframe also contains cell specific reference signals (CRS) 21, which are known to the receiver and used for interference estimation and coherent demodulation of e.g., the control information and payload data.

The remaining resource elements are available for payload data 22, also comprising interspersed CRS elements 21. A downlink system with CFI=3 OFDM symbols as control for a resource block 24 is illustrated in FIG. 4.

A PDCCH (Physical Downlink Control Channel) is used to carry downlink control information (DCI) such as scheduling decisions and power control commands. More specifically, the DCI includes downlink scheduling assignments, including PDSCH (Physical Downlink Shared Channel) resource indication, transport format, hybrid-ARQ (Automatic Repeat Request) information, and control information related to spatial multiplexing (if applicable). A downlink scheduling assignment also includes a command for power control of the Physical Uplink Control Channel (PUCCH) used for transmission of hybrid-ARQ acknowledgements in response to downlink scheduling assignments.

The DCI also includes Uplink scheduling grants, including PUSCH (Physical Uplink Shared Channel) resource indication, transport format, and hybrid-ARQ-related information. An uplink scheduling grant also includes a command for power control of the PUSCH.

Moreover, the DCI includes power control commands for a set of terminals as a complement to the commands included in the scheduling assignments/grants.

One PDCCH carries one DCI message with one of the formats above. As multiple terminals can be scheduled simultaneously, on both downlink and uplink, there must be a possibility to transmit multiple scheduling messages within each subframe. Each scheduling message is transmitted on a separate PDCCH, and consequently there are typically multiple simultaneous PDCCH transmissions within each cell. Furthermore, to support different radio-channel conditions, link adaptation can be used, where the code rate of the PDCCH is selected to match the radio-channel conditions.

Frequency Domain Inter-Cell Interference Coordination (ICIC)

Since LTE is based on OFDMA (Orthogonal Frequency Division Multiplexing), time-frequency resources called physical resource blocks (PRBs) may be muted, i.e. no signal is transmitted, or only mandatory signals, such as the common reference signals (CRS), are transmitted. This helps reduce interference, which allows cell-edge users in adjacent cells to detect data from their serving cell with improved signal quality.

In LTE Rel-8, ICIC is performed over the frequency domain by transmission of messages across a standardised backhaul interface such as X2 (a link between network nodes, such as eNBs). Because the latency over X2 is typically of the order of tens of milliseconds, it is expected that any updates (reconfiguration) to the ICIC messages are relatively infrequent (order of tens of milliseconds). Frequency-domain ICIC over downlink in Rel-8 is based on an event triggered message exchanged between network nodes using relative narrowband transmit power indicators (RNTP), to allow, for example, adaptive fractional frequency reuse (FFR). Uplink ICIC is based on event triggered Overload Indicator (OI) and High Interference Indicator (HII) messages exchanged between network nodes.

Relative Narrowband Transmit Power Indicator (RNTP)

RNTP messages facilitate downlink frequency domain ICIC in LTE Rel-8. The RNTP message is signalled using a bitmap wherein each RNTP bit value indicates whether the corresponding PRB pair is limited by a transmit power threshold or not. Upon receipt of the RNTP message, the recipient network nodes can take into account this information while determining their scheduling decisions for subsequent subframes. However, it is not specified by the LTE standard, what actions the receiver on an RNTP message should take.

Time Domain ICIC

3GPP LTE release 10 specifies time domain ICIC features for heterogeneous networks. This new ICIC feature is sometimes referred to as enhanced ICIC (eICIC) and provides specification of signalling support for time domain based ICIC based on almost blank subframes (ABS).

Figure 5:
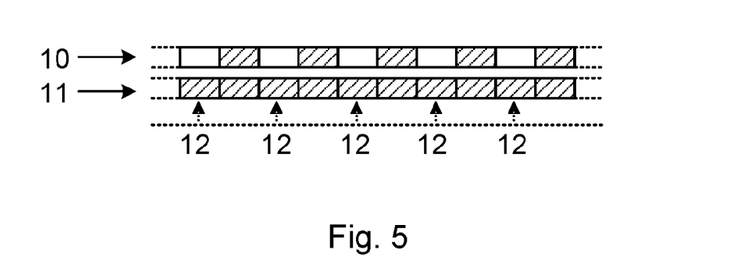
FIG. 5 is a schematic diagram illustrating protected sub-frames for cell-edge users.

The principle of time domain ICIC is illustrated in FIG. 5. In this case an aggressor network node 10 of an interfering macro cell creates an ABS by avoiding to schedule data to macro users in certain subframes 12, thereby creating protected radio resources for adjacent cells such as for a victim network node 11. The macro network node 10 indicates the location of ABSs via the LTE backhaul X2 interface to the neighbouring victim network node 11. The neighbouring victim network node 11 can then take this information into account when scheduling cell-edge users; such that these users are prioritised to be scheduled in protected subframes 12, i.e. low interference subframes. Users operating near the victim network node, i.e. not close to the cell edge, may in principle be scheduled in all subframes. One may notice that time domain ICIC assumes that all cells are time synchronised, as a prerequisite for creating protected subframes.

The transmission power of the PDSCH (Physical Downlink Shared Channel) within an ABS was originally strictly set to zero. This restriction has been relaxed in LTE Rel-11, where the transmit power of certain subframes is reduced by some dB, while CRS maintains the full power. One example of this is reduced power subframes (RPS), which is fully supported by transmission mode 10 in LTE Rel.11.

Video Download

Figure 6:
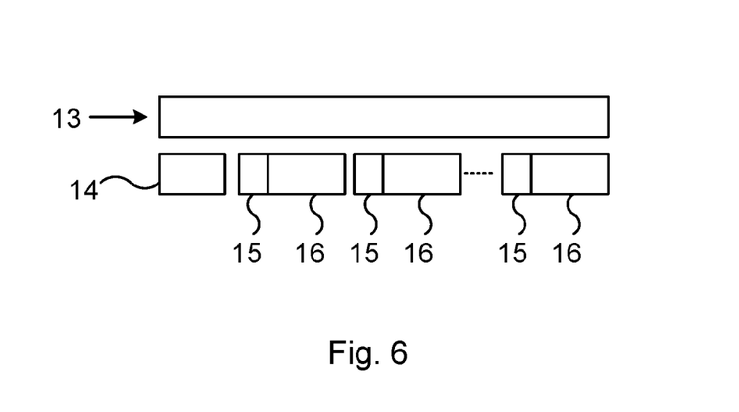
FIG. 6 is a schematic diagram illustrating segmentation in HTTP streaming.

FIG. 6 is a schematic diagram illustrating segmentation of media for HTTP streams e.g. to one or more of the wireless devices 2a-c of FIG. 1. The most common video download algorithm, used e.g. in YouTube, is progressive download, where the video contents is delivered over hypertext transfer protocol (HTTP). The local computer or mobile devices downloads the video content from a server, and the media player can start playing the video as soon as enough data is available at the local media buffer. For HTTP streaming the video file 13 is segmented at the server. The media player at the client first downloads a manifest file 14 which contains a list of URLs (Uniform Resource Locators) of all the available media segments. The media player then downloads all the media segments one after another using HTTP. The media segments are flexible in size, but often contain significant amounts of media data 16, e.g. a few seconds of media data, as well as a header 15. The duration of the media data per media segment is specified in the manifest file 14.

Figure 7:
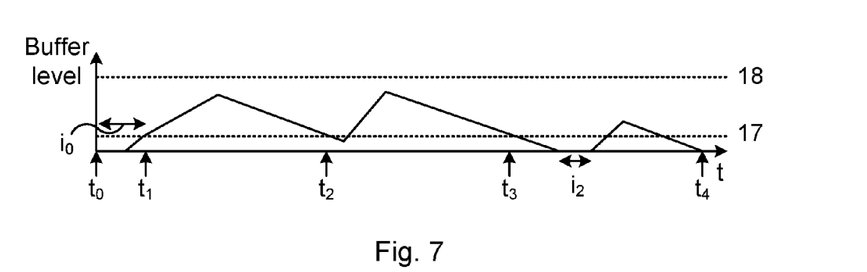
FIG. 7 is a schematic graph illustrating an example of buffer levels in a client for progressive video download.

The video request algorithm determines how the media segments are transmitted to the client. We note that the actual implementation at the wireless device may vary dependent on its operating system. The general principle of a commonly used video request algorithm is shown in FIG. 7. Here, time is on the horizontal axis and buffer level in the wireless device (i.e. client) is indicated on the vertical axis. The process is started at time t0 and the play-out is started at time t1 when the initial pre-buffering interval 10 has elapsed. Refill of the media buffer is requested when the amount of data in local media buffer of the client goes below a minimum media buffer level 17, e.g. at times t2 and t3. It may happen that the local media buffer of the client becomes empty due to network congestion during the video session and the client shows a frozen image, a little bit after t3. This situation is called as frame freeze. Re-buffering is then needed before the client again starts rendering the video. The time taken for re-buffering is called as re-buffering interval i1.

The existing ICIC solutions are exclusively based on radio conditions, such as the received SINR. Traffic fluctuations or requirements of multi-media services, such as play-out deadlines for watching a video, on the other hand, are not taken into account. Moreover, state of the art solutions fail to support various traffic types, e.g. best effort and delay sensitive traffic, as well as different priority classes.

The flow of RNTP message exchange in LTE Rel-8/9 ICIC is from a potential aggressor (i.e. base stations causing interference) network node to a victim network node being the network node that serves one or several victim wireless devices (i.e. cell-edge users exposed to strong interference). However, the aggressor network node may not know whether the victim wireless device is demanding any data within the time frame the RNTP messages are valid. Hence, there is a potential mismatch between provided interference protection and what is actually needed by cell-edge wireless devices.

Many interference coordination approaches, based on ICIC messages exchanged over the X2 interface, attempt to determine the highest transmit power that still allows a victim wireless device to achieve a given performance target, e.g. a certain SINR or interference level. However, such approaches do not teach how to mitigate the problems described above. Rather, such approaches are complementary, and may be combined with embodiments presented herein.

Traffic transmitted over today's mobile networks is bursty in nature, as shown in FIG. 7. This means that interference also occurs in bursts; periods of high interference are followed by periods of low interference, where some network nodes do not transmit any data on the PDSCH. Embodiments presented herein aim to establish an interference coordination scheme that shapes the interference in a way that delay critical data arrives at the mobile terminal before a deadline associated with the delay critical data expires.

Figure 8:
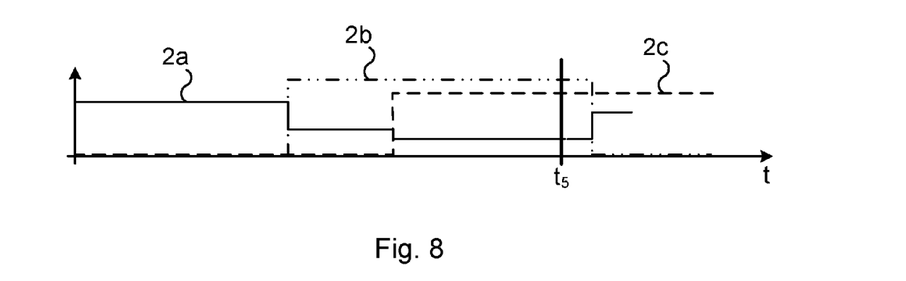
FIG. 8 is a schematic graph illustrating effects on data rates when interference occurs.
Figure 9:
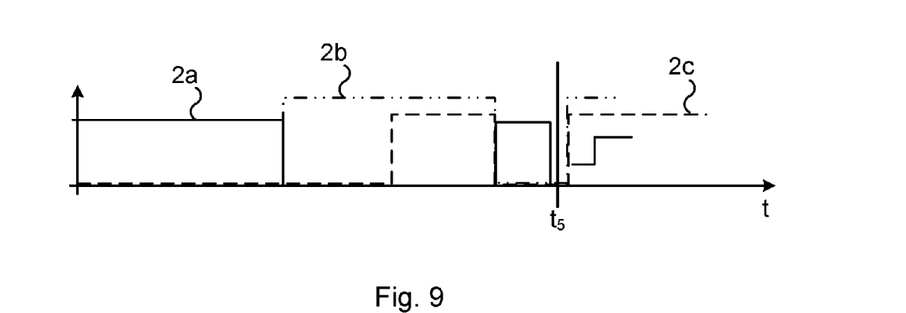
FIG. 9 is a schematic graph illustrating effects on data rates when embodiments presented herein are used to reduce the effects of interference.

The proposed interference coordination scheme is explained with an example in FIG. 8 and FIG. 9. The vertical axis represents downlink data rate and the horizontal axis represents time. In this example, the first wireless device 2a is served by the first network node 1a and is strongly interfered by the second network node 1b and the third network node 1c, as shown in FIG. 1 and explained above. In case the interference from the second network node 1b and the third network node 1c persists, as shown in FIG. 8, the rate of the first wireless device 1a drops below a critical level where consumption from the media buffer exceeds the replenishment of the media buffer, leading to the media buffer eventually becoming empty at time t5.

FIG. 9 depicts the same interference scenario, but now with the proposed ICIC scheme in place. After the rate of the first wireless device 2a drops to a critically low level, due to the interference from the second network node 1b and the third network node 1c, the first wireless device 2a, being the victim, reports the high interference to its serving first network node 1a. The first network node 1a then sends ICIC messages (transmission avoidance requests) to both the second network node 1b and the third network node 1c, including information on how much interference free resources are required to complete its transmission to the first wireless device 1a. The quantity of required interference resource units could e.g. be expressed in PRBs (Physical Resource Blocks) or number of subframes. At a specific time instant, which may also be specified through the ICIC message, both the second network node 1b and the third network node 1c suspend transmissions on a subset of the available resources. After the ICIC message has timed out, and the first wireless device 1a has successfully received its data, the second network node 1b and the third network node 1c may continue to transmit on all available resources.

In the example shown in FIG. 9, both the second network node 1b and the third network node 1c do not miss any deadlines through the temporarily restricted resource allocation. In case the second network node 1b or the third network node 1c could no longer satisfy any of their own users, they may simply ignore the ICIC message from first network node 1a. By doing so, it is avoided that improving the QoS (Quality of Service) of one user does not satisfy the QoS of one or several other users.

In a further embodiment, priorities may be defined, dependent on the traffic class (best effort or delay sensitive traffic), and/or a certain subscription plan (user that are willing to pay a premium get a better QoS). Including the priority within an ICIC message, allows a prioritisation whether a network node must starve one of its served wireless devices upon a received ICIC message from a neighbouring network node.

Figure 10:
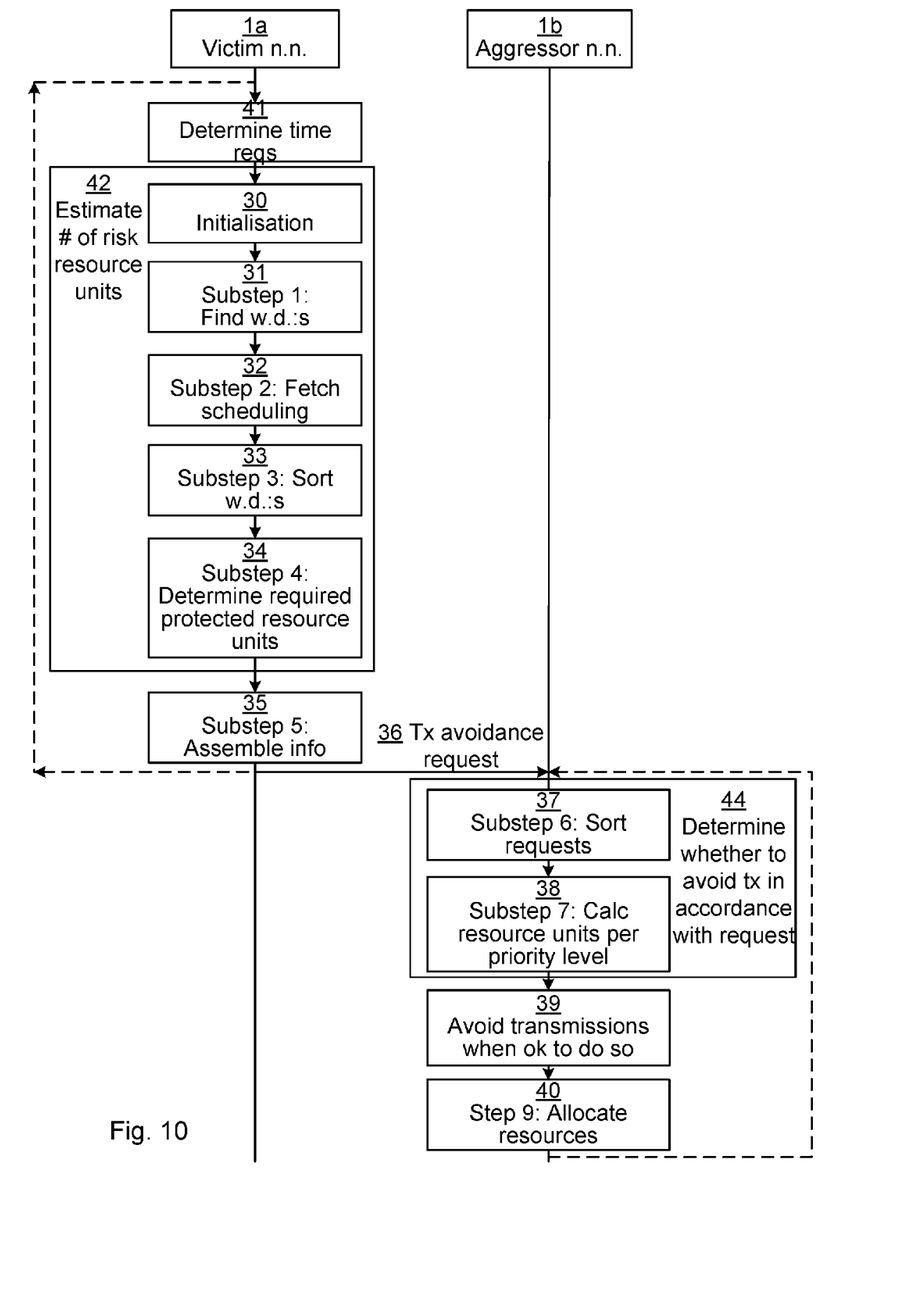
FIG. 10 is a sequence diagram illustrating a sequence for ICIC according to one embodiment.

FIG. 10 is a sequence diagram illustrating a sequence for ICIC according to one embodiment. The sequence diagram illustrates a method performed in the victim network node 1a and a method performed in the aggressor network node 1b and also comprises communication between the network nodes. The victim network node 1a is at risk of having its transmissions of first user data to a first wireless device being interfered by transmissions of second user data to a second wireless device by the aggressor network node 1b. It is to be noted that any network node in a network can be an aggressor, victim, both at the same time or neither. Moreover, this changes over time as wireless devices move about.

First, in a determine time requirements step 41, the time requirements of first user data to be transmitted to the first wireless device by the victim network node 1a is determined. For example, as seen FIG. 9, the deadline for a particular set of data for a wireless device can be determined to avoid a media buffer in the wireless device going too low. This time requirement can e.g. be acquired by deep packet inspection or by explicit signalling from the wireless device in question.

After this step, there is a estimate # of risk resource units step 42 to estimate a number of risk resource units which need to be protected from interference, in order to be able to transmit the user data to the first wireless device. This step may comprise a number of substeps 30-34.

Initialisation 30: define cellEdgeSinr, interferenceLevel, RNTPbitmap, noOfReservedSubband, and ICICRefreshRate.

The cellEdgeSinr is the threshold use to define a cell-edge user. SINR of the cell-edge user must be less than or equal to the cellEdgeSinr.

The interferenceLevel defines a threshold to identify those cell-edge users, who are heavily interfered by the neighbouring network nodes. Not all the cell-edge users are always affected by out-of-cell interference. The SINR of some users may be limited by low signal strength due to high path loss, such users are noise limited and not interference limited. These users might not gain much in performance by ICIC. Hence, the interferenceLevel is used to locate users observing high downlink interference.

The parameter noOfReservedSubband is used to define the maximum number of resource units (PRBs or subframes) per cell that will be reserved for the allocation of victim wireless devices, who are experiencing high interference in the downlink. Neighbouring aggressor network nodes of the victim wireless device are restricted from using those resource units.

The RNTPbitmap$_{i,n}$ specifies which PRBs for a victim wireless device in cell i are to be restricted from access by aggressor network node n. In order to avoid collisions of RNTP bitmaps, a predefined pattern might be used, where adjacent network nodes are assigned mutually non-overlapping patterns. Collisions of RNTP bitmaps may occur, if two adjacent network nodes attempt to protect the same PRBs. These pre-defined patterns of RNTP bitmaps are similar to a traditional frequency reuse plan. However, the difference in the context of this algorithm is that the pattern only specifies the potential locations of protected PRBs. Only if a corresponding ICIC message is received, may an aggressor network node be obliged not to access the reserved PRBs.

When the resource units are sub-frames, a vector comprising references to sub-frames which are potential interferers replaces the RNTPbitmap$_{i,n}$.

ICICRefreshRate is used to define how frequently one network node sends RNTP requests to its neighbouring network node(s). Exchange of RNTP message are time synchronised among all network nodes in the network. RNTP messages do not need to be sent in every sub frame. A subframe is the basic time domain unit for scheduling, consisting of two consecutive time slots. The time difference between two consecutive RNTP messages is equal to the ICICRefreshRate. Only if a network node serves cell-edge user experiencing high interference, it will send RNTP messages to the aggressor network nodes, as defined below.

Substep 1: Find cell-edge users, i.e. users who experience high downlink interference. A user is heavily interfered by network node n, when RSRP$_n$>interferenceLevel.

In an alternative embodiment the declaration of a cell-edge wireless device served by network node i that is heavily interfered by network node n is done by calculating the relative improvement in signal quality, in accordance with equation (1), if the interference from interfering network node n was removed $$\Delta_{i,n} = \frac{N_0 + I_{tot}}{N_0 + I_{tot} - I_n} = \frac{y - RSRP_i}{y - RSRP_i - RSRP_n} \quad (1)$$

where $N_o$, $I_{tot}$ and $I_n$ denote thermal noise, total interference power and interference power from network node n, respectively. A cell-edge wireless device is declared a victim wireless device of network node n, if the RSRP of network node n and/or $\Delta_{i,n}$ is above a predefined threshold.

Substep 2: Fetch the scheduling order of the cell-edge users served by a given network node. The scheduling order is determined by the network node scheduler. Examples of scheduling algorithms are a proportional fair scheduler or delay sensitive scheduler Substep 3: Sort the cell-edge victim wireless devices (as determined in substep 1), according to their scheduling order. This gives an ordered list about users that are heavily interfered and have data to transmit at that moment. The ordering may also be adjusted based on the user priority and traffic class. Pick the $N_{victim}$ victim wireless devices according to their scheduling order. Typical values for $N_{victim}$ are 1 or 2.

Substep 4: Determine the number of required risk resource units for the $N_{victim}$ wireless devices. Equation (2) discloses an example for when the risk resource units are PRBs:

$$noOfRequiredReservedSubband = \text{ceiling}\left(\frac{\text{Total buffered data at the } eNB}{(\text{amount of data carried per } PRBs \times ICICRefreshRate)}\right) \quad (2)$$

where the amount of data carried per PRB is estimated from the observed SINR. The noOfRequiredReservedSuband is used to determine the actual number of PRBs that are needed to transfer the whole buffered data of a victim wireless device at the serving network node within a period of ICICRefreshRate. The actualNumberOfReservedSuband is the minimum of the noOfRequiredReservedSuband and the noOfReservedSubband.

When the risk resource units are sub-frames, an equivalent calculation is performed to determine a number of risk sub-frames.

Assemble info step 35: Assemble the RNTP bitmap RNTPbitmap$_{i,n}$ (or equivalent vector for sub-frames, and send an ICIC message (transmission avoidance request) to the interfering neighbouring network node(s) 1b. The transmission avoidance request may optionally contain some additional information about the traffic class (delay sensitive or best effort traffic), and the user priority. The interference protection is updated every ICICRefreshRate period. This means the resource units are reserved for only ICICRefreshRate period. The network node will subsequently send another transmission avoidance request if it wants again to reserve the resource units.

The transmission avoidance request comprises a reference to at least one risk resource unit intended to be used for transmissions by the victim network node to the first wireless device, which correspond in number to the number of risk resource units.

Steps 41, 42 and 35 can be repeated for every ICICRefreshRate period.

The aggressor network node 1b receives one or more transmission avoidance requests 36 from one or more victim network nodes. The actual interference coordination through muting for the upcoming cycle of ICICRefreshRate is then executed by performing the following substeps:

A determine whether to avoid tx in accordance with request step 44 to determine whether to avoid transmissions in accordance with request may comprise two substeps: substep 6 (37 in FIG. 10) and substep 7 (38 in FIG. 10).

Substep 6: The incoming transmission avoidance requests are sorted with respect to their user priority levels Substep 7: The network node calculates the number of required PRBs for each priority level over the ICICRefreshRate period. The computation is done in a similar manner as in substep 4 above, i.e. the determine required protected resource units step 34.

Avoid transmissions when ok to do so step 39: for each priority level, check whether the total number of PRBs minus the anticipated number of required PRBs to serve its connected users is less than actualNumberOfReservedSuband of the received RNTP bitmaps. If yes, then mute the PRBs as requested from the RNTP bitmaps. If no, the aggressor network node may ignore the ICIC message and transmit on the reserved PRBs. If the current priority level does not consume all available PRBs, move to the next lower priority level.

In other words, the aggressor network node 1b avoids user data transmissions to the second wireless device using the at least one risk resource unit, when such avoiding is not expected to significantly degrade a user experience of the second wireless device. For example, a media buffer in the second wireless device is above the minimum buffer size, a delay of a new segment file does not cause any significant degrade in the user experience of the second wireless device, since it can be expected that there will be no rebuffering.

In one embodiment, the aggressor network node 1b determines to always avoid user data transmissions to the second wireless device using the at least one risk resource unit when a user priority for transmission by the victim network node to the first wireless device is higher than a user priority for transmission by the aggressor network node of user data transmissions to the second wireless device.

Allocate resources step 40: Perform resource allocation on any PRBs that are not marked as restricted. In other words, when it is determined not to avoid user data transmissions using the at least one risk resource unit, the aggressor network node 1b schedules data transmission to the second wireless device using at least part of the at least one risk resource unit, and may in this case cause interference.

Steps 44, 39 and 40 can be repeated for every ICICRefreshRate period Time domain ICIC is specified in LTE Rel-10/11 and involves the allocation of almost blank subframes (ABS) or reduced power subframes (RPS). The proposed time domain ICIC schemes works very similar to its frequency domain counterpart described above. The major difference is that instead of PRBs, subframes are subject to interference coordination.

Figure 11:
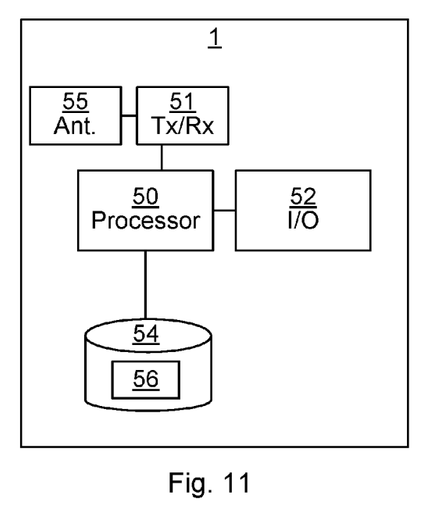
FIG. 11 is a schematic diagram showing some components of any one of the network nodes of FIG. 1, here represented by a single network node.

FIG. 11 is a schematic diagram showing some components of any one of the network nodes of FIG. 1, here represented by a single network node 1. The network node 1 may be an aggressor network node and/or a victim network node and this may change over time. A processor 50 is provided using any combination of one or more of a suitable central processing unit (CPU), multiprocessor, microcontroller, digital signal processor (DSP), application specific integrated circuit etc., capable of executing software instructions 56 stored in a memory 54, which can thus be a computer program product. The processor 50 can be configured to execute the method described with reference to FIG. 10 above.

The memory 54 can be any combination of read and write memory (RAM) and read only memory (ROM). The memory 54 also comprises persistent storage, which, for example, can be any single one or combination of magnetic memory, optical memory, solid state memory or even remotely mounted memory.

The network node 1 further comprises an I/O interface 52 for communicating with the core network and optionally with other network nodes, e.g. over the X2 interface to send or receive transmission avoidance requests.

The network node 1 also comprises one or more transceivers 51, comprising analogue and digital components, and a suitable number of antennas 55 for radio communication with wireless devices within one or more radio cells, optionally using remote radio units and/or sectors. The processor 50 controls the general operation of the network node 1, e.g. by sending control signals to the transceiver 51 and receiving reports from the transceiver 51 of its operation. In one embodiment, the I/O interface 52 is directly connected to the transceiver 51, whereby data to and from the core network is directly routed between the I/O interface 52 and the transceiver 51.

Other components of the network node 1 are omitted in order not to obscure the concepts presented herein.

Figure 12:
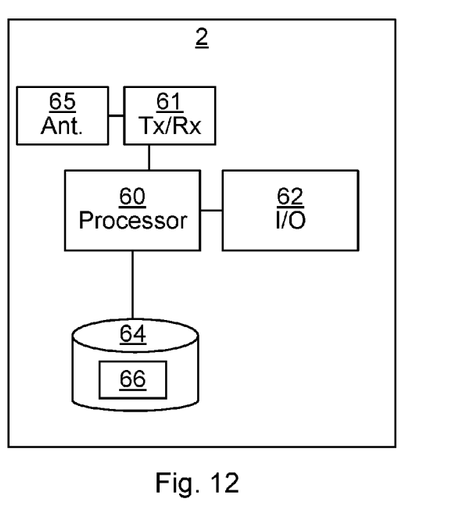
FIG. 12 is a schematic diagram showing some components of any one of the wireless devices of FIG. 1, here represented by a single wireless device.

FIG. 12 is a schematic diagram showing some components of any one of the wireless devices of FIG. 1, here represented by a single wireless device 2. A processor 60 is provided using any combination of one or more of a suitable central processing unit (CPU), multiprocessor, microcontroller, digital signal processor (DSP), application specific integrated circuit etc., capable of executing software instructions 66 stored in a memory 64, which can thus be a computer program product.

The memory 64 can be any combination of read and write memory (RAM) and read only memory (ROM). The memory 64 also comprises persistent storage, which, for example, can be any single one or combination of magnetic memory, optical memory, solid state memory or even remotely mounted memory.

The wireless device 2 further comprises an I/O interface 62. I/O interface can comprise a local I/O interface and/or a user interface including a display, input devices (keypads, touch sensitivity of the screen, etc.), speaker, microphone, etc.

The wireless device 2 also comprises one or more transceivers 61, comprising analogue and digital components, and a suitable number of antennas 65 for radio communication with network node(s). The processor 60 controls the general operation of the wireless device.

Other components of the wireless device 2 are omitted in order not to obscure the concepts presented herein.

Figure 13:
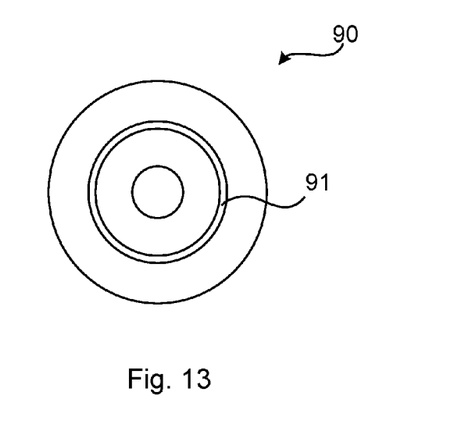
FIG. 13 shows one example of a computer program product 90 comprising computer readable means.

FIG. 13 shows one example of a computer program product 90 comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 56 of FIG. 11. While the computer program 91 is here schematically shown as a track on the depicted optical disk, the computer program can be stored in any way that is suitable for the computer program product.

Figure 14A:
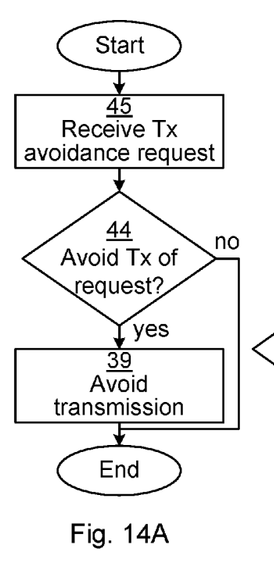
FIGS. 14A-B are flow charts illustrating methods performed in an aggressor network node of FIG. 1 for reducing interference.
Figure 14B:
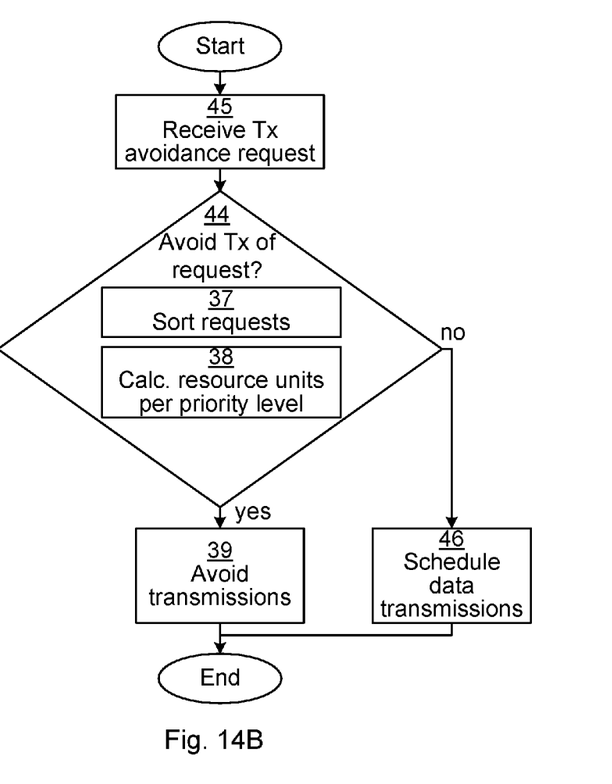

FIGS. 14A-B are flow charts illustrating methods performed in an aggressor network node of FIG. 1 for reducing interference. The methods correspond to the steps of the aggressor network node of FIG. 10, and details of most steps are explained with reference to FIG. 10 above.

Looking first to FIG. 14A, this method starts with a receive TX (transmission) avoidance request step 45. The TX avoidance request 36 is received from the victim network node and comprises a reference to at least one risk resource unit intended to be used for transmissions by the victim network node to the first wireless device.

In a conditional determine whether to avoid tx in accordance with request step 44, it is determined whether to avoid transmissions in accordance with the transmission avoidance request 36. If this is the case, the method proceeds to the avoid transmissions step 39.

In FIG. 14B, it is shown how, when it is determined not to avoid transmissions in accordance with the transmission avoidance request 36, the method proceeds to a schedule data transmissions step 46. This can e.g. be due to higher priority of the transmissions of the aggressor network node or that the media buffer(s) of wireless device(s) connected to the aggressor network node are running low and need to be filled with data.

In the schedule data transmissions step 46, data transmissions of the aggressor network node are scheduled without consideration to the transmission avoidance request.

Figure 15:
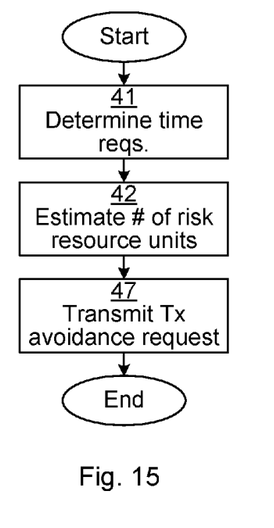
FIG. 15 is a flow chart illustrating methods performed in a victim network node of FIG. 1 for reducing interference.

FIG. 15 is a flow chart illustrating methods performed in a victim network node of FIG. 1 for reducing interference. The methods correspond to the steps of the victim network node of FIG. 10, and details of most steps are explained with reference to FIG. 10 above.

First, there is the determine rime requirements step 41, followed by the estimate # of risk resource units step 42. After that there is a transmit TX avoidance request step 47, in which the transmission avoidance request is transmitted to the aggressor network node. As explained above, the transmission avoidance request 36 comprises a reference to at least one risk resource unit intended to be used for transmissions by the victim network node. The transmission avoidance request 36 is transmitted to the first wireless device. The number of resource units to request avoided transmissions corresponds to the number of risk resource units. In this way, if followed by the aggressor network node, the effects of the interference is reduced in such a way as to avoid significant ill-effects, such as the media buffer in the victim wireless node running out.

Figure 16:
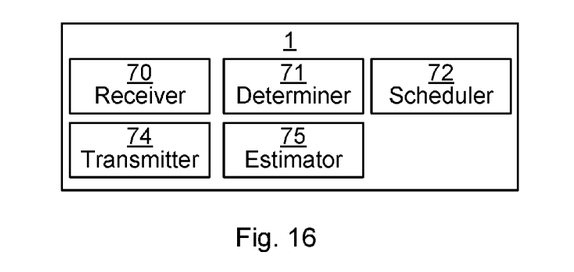
FIG. 16 is a schematic diagram showing functional modules of an embodiment of a network node according to FIG. 1.

FIG. 16 is a schematic diagram showing functional modules of an embodiment of a network node according to FIG. 1. The modules can be implemented using software instructions such as a computer program executing in the network node 1 and/or using hardware, such as application specific integrated circuits, field programmable gate arrays, discrete logical components, etc. The modules correspond to the steps in the methods illustrated in FIGS. 10, 14A-B and 15.

A receiver 70 is arranged to receive the TX avoidance request. This module corresponds to the receive TX avoidance request step 45.

A determiner 71 is arranged to determine when to avoid transmissions in accordance with the TX avoidance request. The determiner 71 is also arranged to determine timer requirements. This module corresponds to the avoid TX of request step 44 and the determine time requirements step 41.

A scheduler 72 is arranged to schedule downlink data in accordance with the result from the determiner 71 with regard to whether avoid transmissions in accordance with the TX avoidance request or not. This module corresponds to the avoid transmissions step 39, the schedule data transmissions step 46 and allocate resources step 40.

A transmitter 74 is arranged to transmit the TX avoidance request. This module corresponds to the transmit TX accordance request step 47.

An estimator 75 is arranged to estimate the number of risk resource units. This module corresponds to the estimate # of risk resource units step 42.

A number of beneficial effects result from the various embodiments presented herein:

- Improved user experience for delay sensitive services such as video download
- Exploit the nature of bursty packet switched data traffic by shaping the interference in a way to allow cell-edge wireless devices to receive their delay sensitive data on time
- Facilitate interference coordination for different types of traffic.
- Support optional priority classes, e.g. give users an enhanced experience who are willing to pay a premium.

The invention has mainly been described above with reference to a few embodiments. However, as is readily appreciated by a person skilled in the art, other embodiments than the ones disclosed above are equally possible within the scope of the invention.

The invention claimed is:

1. A method for reducing interference between network nodes of a cellular network, the method being performed in an aggressor network node, being a network node risking to interfere with transmissions to a first wireless device by a victim network node, the method comprising the steps of:
   receiving a transmission avoidance request from the victim network node, the transmission avoidance request comprising a reference to at least one risk resource unit intended to be used for transmissions by the victim network node to the first wireless device;
   determining whether to comply with the transmission avoidance request by avoiding user data transmissions to a second wireless device using the at least one risk resource unit, the determination being based on whether a user experience of the second wireless device is expected to significantly degrade by avoiding the user data transmissions to the second wireless device; and
   when it is determined to comply with the transmission avoidance request by avoiding user data transmissions using the at least one risk resource unit, avoiding user data transmission using the at least one risk resource unit.

2. The method according to claim 1, further comprising the step of:
   when it is determined not to comply with the transmission avoidance request, scheduling data transmission to the second wireless device using at least part of the at least one risk resource unit.

3. The method according to claim 1, wherein the step of determining comprises determining to avoid user data transmissions to the second wireless device using the at least one risk resource unit when such avoiding is not expected to significantly degrade a user experience of the second wireless device.

4. The method according to claim 1, wherein the step of determining comprises determining to always avoid user data transmissions to the second wireless device using the at least one risk resource unit when a user priority for transmission by the victim network node to the first wireless device is higher than a user priority for transmission by the aggressor network node of user data transmissions to the second wireless device.

5. The method according to claim 1, wherein each one of the at least one risk resource units is defined using physical resource blocks, PRBs, each PRB being restricted to a time slot within a sub-frame and a frequency band.

6. The method according to claim 1, wherein each one of the at least one risk resource units is defined as a sub-frame.

7. The method according to claim 1, wherein, in the receiving step, the transmission avoidance request comprises references to resource units intended to be used for transmissions by the victim network node to a plurality of wireless devices.

8. A network node for reducing interference between network nodes of a cellular network, the network node running a risk of being an aggressor network node, being a network node risking to interfere with transmissions to a first wireless device by a victim network node, the network node comprising:
   a processor; and
   a memory storing instructions that, when executed by the processor, causes the network node to:
   receive a transmission avoidance request from the victim network node, the transmission avoidance request comprising a reference to at least one risk resource unit intended to be used for transmissions by the victim network node to the first wireless device;
   determine whether to comply with the transmission avoidance request by avoiding user data transmissions to a second wireless device using the at least one risk resource unit, the determination being based on whether a user experience of the second wireless device is expected to significantly degrade by avoiding the user data transmissions to the second wireless device; and
   when it is determined to comply with the transmission avoidance request by avoiding user data transmissions using the at least one risk resource unit, avoiding user data transmission using the at least one risk resource unit.

9. The network node according to claim 8, further comprising instructions that, when executed by the processor, cause the network node to schedule data transmission to the second wireless device using at least part of the at least one risk resource unit when it is determined not to comply with the transmission avoidance request.

10. The network node according to claim 8, wherein the instructions to determine comprise instructions that, when executed by the processor, cause the network node to determine to avoid user data transmissions to the second wireless device using the at least one risk resource unit when such avoiding is not expected to significantly degrade a user experience of the second wireless device.

11. The network node according to claim 8, wherein the instructions to determine comprise instructions that, when executed by the processor, cause the network node to determining to always avoid user data transmissions to the second wireless device using the at least one risk resource unit when a user priority for transmission by the victim network node to the first wireless device is higher than a user priority for transmission by the aggressor network node of user data transmissions to the second wireless device.

12. The network node according to claim 8, wherein each one of the at least one risk resource units is defined using physical resource blocks, PRBs, each PRB being restricted to a time slot within a sub-frame and a frequency band.

13. The network node according to claim 8, wherein each one of the at least one risk resource units is defined as a sub-frame.

14. The network node according to claim 8, wherein the transmission avoidance request comprises references to resource units intended to be used for transmissions by the victim network node to a plurality of wireless devices.

15. A method for reducing interference between network nodes of a cellular network, the method being performed in a victim network node, being at risk of having its transmissions of first user data to a first wireless device being interfered with by transmissions of second user data to a second wireless device by an aggressor network node, the method comprising the steps of:
- determining a time requirement of the first user data to be transmitted to the first wireless device by the victim network node;
- estimating, based on the time requirement, a number of risk resource units which need to be protected from interference to be able to transmit the user data to the first wireless device; and
- transmitting a transmission avoidance request to the aggressor network node, the transmission avoidance request comprising:
  - a reference to at least one risk resource unit intended to be used for transmissions by the victim network node to the first wireless device, and
  - a user priority for transmisson of the first user data by the victim network node to the first wireless device.

16. The method according to claim 15, wherein each one of the at least one risk resource units is defined using physical resource blocks, PRBs, each PRB being restricted to a time slot within a sub-frame and a frequency band.

17. The method according to claim 15, wherein each one of the at least one risk resource units is defined as a sub-frame.

18. A network node running a risk of being a victim node, with regard to interference between network nodes of a cellular network, being at risk of having its transmissions of first user data to a first wireless device being interfered with by transmissions of second user data to a second wireless device by an aggressor network node, the network node comprising:
- a processor; and
- a memory storing instructions that, when executed by the processor, causes the network node to:
  - determine a time requirement of the first user data to be transmitted to the first wireless device by the victim network node;
  - estimate, based on the time requirement, a number of risk resource units which need to be protected from interference to be able to transmit the user data to the first wireless device; and
  - transmit a transmission avoidance request to the aggressor network node, the transmission avoidance request comprising:
    - a reference to at least one risk resource unit intended to be used for transmissions by the victim network node to the first wireless device, and
    - a user priority for transmisson of the first user data by the victim network node to the first wireless device.

19. The network node according to claim 18, wherein each one of the at least one risk resource units is defined using physical resource blocks, PRBs, each PRB being restricted to a time slot within a sub-frame and a frequency band.

20. The network node according to claim 18, wherein each one of the at least one risk resource units is defined as a sub-frame.

* * * * *